(12) United States Patent
Maekawa et al.

(10) Patent No.: US 8,129,931 B2
(45) Date of Patent: Mar. 6, 2012

(54) MOTOR CONTROL DEVICE, MOTOR DRIVE SYSTEM, WASHING MACHINE, AIR CONDITIONER AND METHOD OF CHANGING MAGNETIZATION AMOUNT OF PERMANENT MAGNET MOTOR

(75) Inventors: Sari Maekawa, Yokohama (JP); Kazunobu Nagai, Yokohama (JP); Isamu Nitta, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 429 days.

(21) Appl. No.: 12/428,840

(22) Filed: Apr. 23, 2009

(65) Prior Publication Data
US 2009/0267546 A1    Oct. 29, 2009

(30) Foreign Application Priority Data
Apr. 23, 2008    (JP) ................................. 2008-112437

(51) Int. Cl.
*H02P 21/00*    (2006.01)

(52) U.S. Cl. ................... 318/400.02; 318/401; 318/812; 318/720; 180/65.265; 180/65.225

(58) Field of Classification Search ............. 318/400.02, 318/812, 720, 401; 180/65.225, 65.265
See application file for complete search history.

(56) References Cited

U.S. PATENT DOCUMENTS

| | | | | | |
|---|---|---|---|---|---|
| 5,920,161 | A | * | 7/1999 | Obara et al. | 318/139 |
| 2006/0290312 | A1 | * | 12/2006 | Nagai et al. | 318/599 |
| 2008/0297099 | A1 | * | 12/2008 | Maekawa | 318/799 |
| 2009/0261774 | A1 | * | 10/2009 | Yuuki et al. | 318/720 |

FOREIGN PATENT DOCUMENTS

| | | | | |
|---|---|---|---|---|
| JP | 2003199390 | A | * | 7/2003 |
| JP | 2005160183 | A | * | 6/2005 |
| JP | 2006-280195 | | | 10/2006 |

* cited by examiner

*Primary Examiner* — Walter Benson
*Assistant Examiner* — Jorge Carrasquillo
(74) *Attorney, Agent, or Firm* — Pillsbury Winthrop Shaw Pittman, LLP (57) ABSTRACT

A motor control device includes a magnetization control unit energizing a motor winding to change magnetic flux content of permanent magnet motor, a current detector detecting current supplied to the motor, a vector control unit including a speed/position estimation unit carrying out an operation to estimate a motor rotational speed and rotational position, the vector control unit carrying out a vector control of the motor, an induced voltage detector detecting an induced voltage of the motor based on the rotational speed, motor currents obtained by the vector control unit, output voltages of the drive unit, a winding inductance or the motor constant and a winding resistance, an induced voltage command determining unit determining an induced voltage command based on the motor rotational speed and output torque, and a magnetization current determining unit determining an amount of energization based on the induced voltage of the motor and the induced voltage command.

16 Claims, 9 Drawing Sheets

MOTOR CONTROL DEVICE, MOTOR DRIVE SYSTEM, WASHING MACHINE, AIR CONDITIONER AND METHOD OF CHANGING MAGNETIZATION AMOUNT OF PERMANENT MAGNET MOTOR

CROSS-REFERENCE TO RELATED APPLICATIONS

This application is based on and claims the benefit of priority from the prior Japanese Patent Application No. 2008-112437, filed on Apr. 23, 2008, the entire contents of which are incorporated herein by reference.

BACKGROUND

1. Field

The present invention relates to a motor control device driving a permanent magnet motor in which a rotor includes permanent magnets each having such a low coercive force that an amount of magnetization is changeable, a motor drive system comprising the permanent magnet motor and the motor control device, a washing machine comprising the motor drive system, an air conditioner comprising the motor drive system, and a method of changing a magnetization amount of the permanent magnet motor.

2. Related Art

Techniques for variable speed operation of permanent magnet motors ranging from low to high speeds have recently become widespread for the purpose of reducing electric power consumption. A vector control is executed for the permanent magnet motors by means of an inverter device in the techniques. Japanese patent application publication JP-A-2006-280195 (hereinafter, "patent document 1") discloses a permanent magnet motor which can improve a motor efficiency over an entire variable speed range and realize an improvement in reliability. The disclosed permanent magnet motor is configured as follows. The permanent magnet motor comprises a stator provided with windings, permanent magnets each having such a low coercive force that a flux density is irreversibly changed by a magnetic field established by stator winding current, and a rotor provided with high coercive permanent magnets each having a coercive force twice as large as the low coercive force or above. When the motor is driven at a high speed that requires voltage equal to or larger than a maximum power-supply voltage, a total interlinkage magnetic flux is adjusted by magnetizing the low coercive permanent magnets by a magnetic flux due to current so that the total interlinkage magnetic flux by the low and high coercive permanent magnets is reduced.

In patent document 1, stator windings of the motor are energized by d-axis current obtained by a vector control when low coercive permanent magnets are magnetized. A current value and the number of times of energization are determined based on experimental data. For example, the current value and number of times of energization are determined based on the experimental result that the motor flux content is reduced by 10% when 10 amperes of d-axis current are applied in the negative direction. In this case, however, an actual rotor flux content of the motor is uncertain after the low coercive permanent magnets are magnetized or demagnetized. Thus, there is a problem that the motor cannot always be operated with an optimum efficiency.

SUMMARY

Therefore, an object of the present invention is to realize a quantitative evaluation of magnetic flux content when a magnetized state of permanent magnets of the motor rotor is changed.

According to one aspect of the present invention, there is provided a motor control device which controls a permanent magnet motor including a rotor provided with a permanent magnet having such a low coercive force that a magnetic flux content is changeable, the device comprising a drive unit which drives the motor by energization of a winding of the motor, a magnetization control unit which energizes the motor winding via the drive unit, thereby changing a magnetic flux content of the permanent magnet motor, a current detector which detects current supplied to the motor, a vector control unit including a speed/position estimation unit which carries out an operation based on the motor current, an output voltage of the drive unit and a motor constant thereby to estimate a rotational speed and rotational position of the motor, the vector control unit carrying out a vector control of the motor via the drive unit, an induced voltage detector which detects an induced voltage of the motor based on the rotational speed, motor currents obtained by the vector control unit, output voltages of the drive unit, a winding inductance that is the motor constant and a winding resistance, an induced voltage command determining unit which determines an induced voltage command based on the rotational speed and an output torque of the motor, and a magnetization current determining unit which determines an amount of energization based on the induced voltage of the motor and the induced voltage command.

According to another aspect of the present invention, there is provided a motor drive system comprising a permanent magnet motor including a rotor provided with a permanent magnet having such a low coercive force that a magnet flux content is changeable and the above-described motor control device.

According to further another aspect of the present invention, there is provided a washing machine comprising a permanent magnet motor including a rotor provided with a permanent magnet having such a low coercive force that a magnet flux content is changeable and the above-described motor control device, wherein a driving force for a washing or dehydrating operation is produced by the permanent magnet motor.

According to further another aspect of the present invention, there is provided an air conditioner comprising a permanent magnet motor including a rotor provided with a permanent magnet having such a low coercive force that a magnet flux content is changeable and the above-described motor control device, wherein a compressor is driven by the permanent magnet motor.

According to further another aspect of the present invention, there is provided a method of changing a magnetization amount of a permanent magnet motor, comprising detecting an energizing current supplied via a drive unit to the motor including a rotor provided with a permanent magnet having such a low coercive force that a magnet flux content is changeable, changing a magnetization amount of the permanent magnet via the drive unit when an operation is carried out based on the motor energizing current, an output voltage of the drive unit and a motor constant thereby to estimate a rotational speed and rotational position of the motor, detecting an induced voltage of the motor based on the rotational speed, motor currents obtained by a vector control, output voltages of the drive unit, a winding inductance that is the motor constant and a winding resistance, determining an induced voltage command based on the rotational speed of the motor and an output torque of the motor, and determining an amount of energization based on the induced voltage of the motor and the induced voltage command.

According to each of the above-described arrangements and method, an amount of magnetization of the permanent magnet constituting the rotor of the permanent magnet motor is properly changeable according to a required drive performance.

DETAILED DESCRIPTION

A first embodiment will be described with reference to FIGS. 1A to 8. FIG. 5 shows a rotor of a permanent magnet motor 1 (outer rotor type brushless motor). The permanent magnet motor 1 is obtained by reconfiguring a motor having the same characteristic as disclosed in patent document 1 into the outer rotor type.

The permanent magnet motor 1 comprises a stator 2 and the rotor 3 provided around the stator 2 as shown in FIG. 5. The stator 2 comprises a stator core 4 and a stator winding 5. The stator core 4 is made by stacking and swaging a number of steel plates as a stamped-out soft magnetic material. The stator 4 includes an annular yoke 4a and a number of teeth 4b protruding radially from an outer circumference of the yoke 4a. The stator core 4 has a surface covered with a polyethylene terephthalate (PET) resin (molding resin) except for an outer circumference 4b which defines a gap together with an inner circumference of the rotor 3. A plurality of mounts 6 each made from the PET resin is formed integrally on an inner circumference of the stator 2. Each mount 6 is formed with one or two screw holes 6a. The mounts 6 are screwed on the rear of a water tub 25 of the drum washer-dryer 21 so that the stator 2 is secured to the rear of a water tub 25 (see FIG. 7). The stator winding 5 has three phases and is wound on the teeth 4b.

The rotor 3 comprises a frame 7, a rotor core 8 and a plurality of permanent magnets 9 all of which are integrated by molding resin. The frame 7 is formed into the shape of a flat bottomed cylinder by pressing a magnetic body such as iron plate. The frame 7 includes a circular main plate portion 7a (see FIG. 5), a step 7b (see FIG. 6) extending from an outer circumference of the main plate portion 7a and an annular circumferential wall 7c (see FIG. 5) standing up from the step 7b. The main plate portion 7a has a shaft mount 10 formed on the center thereof. A rotating shaft 26 (see FIG. 7) is adapted to be mounted in the shaft mount 10. The rotor 3 has a plurality of air holes 11 and ribs 12 both formed radially about the shaft mount 10.

Figure 5:
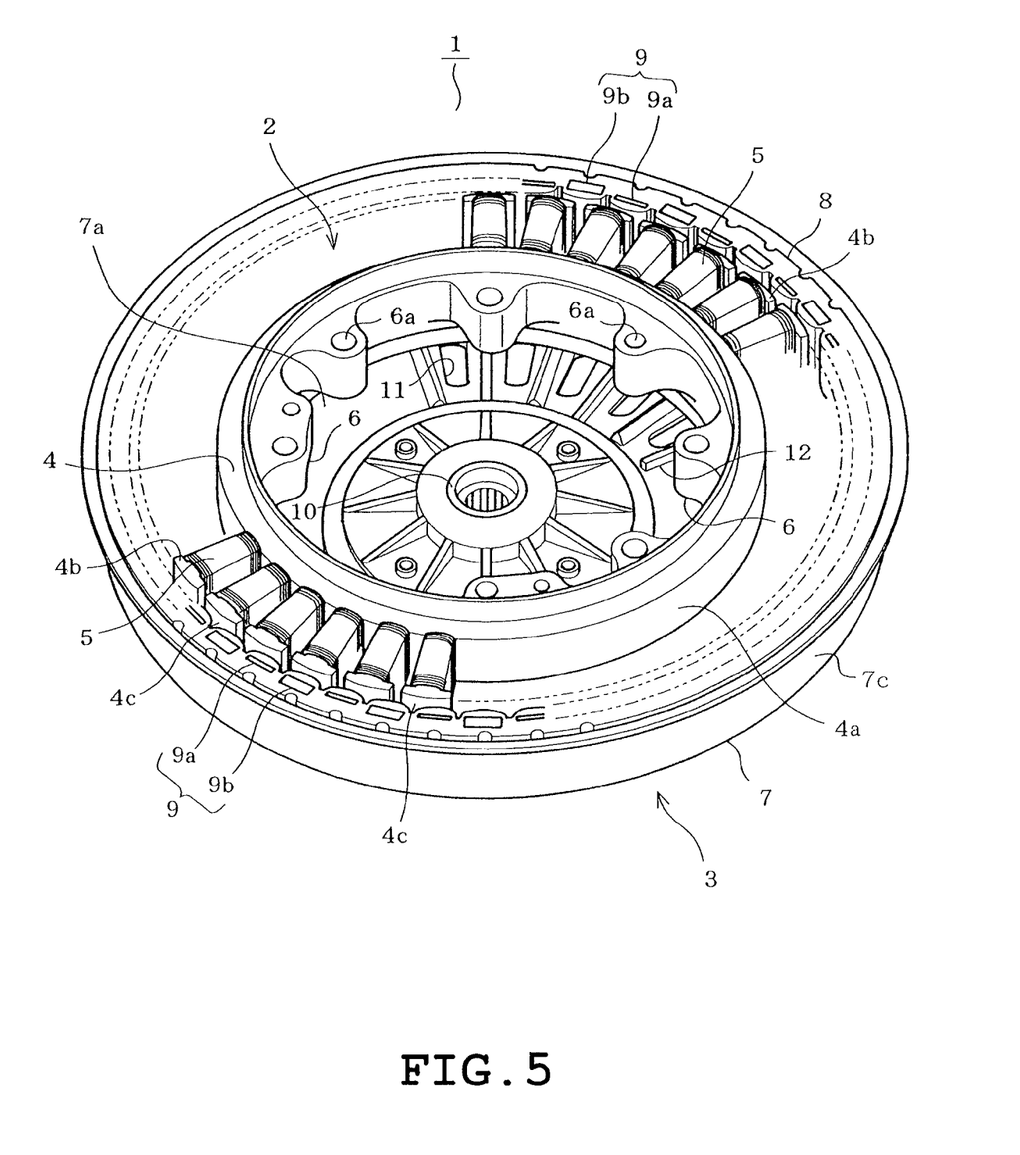
FIG. 5 is a perspective view showing an arrangement of the rotor of the permanent magnet motor.
Figure 6:
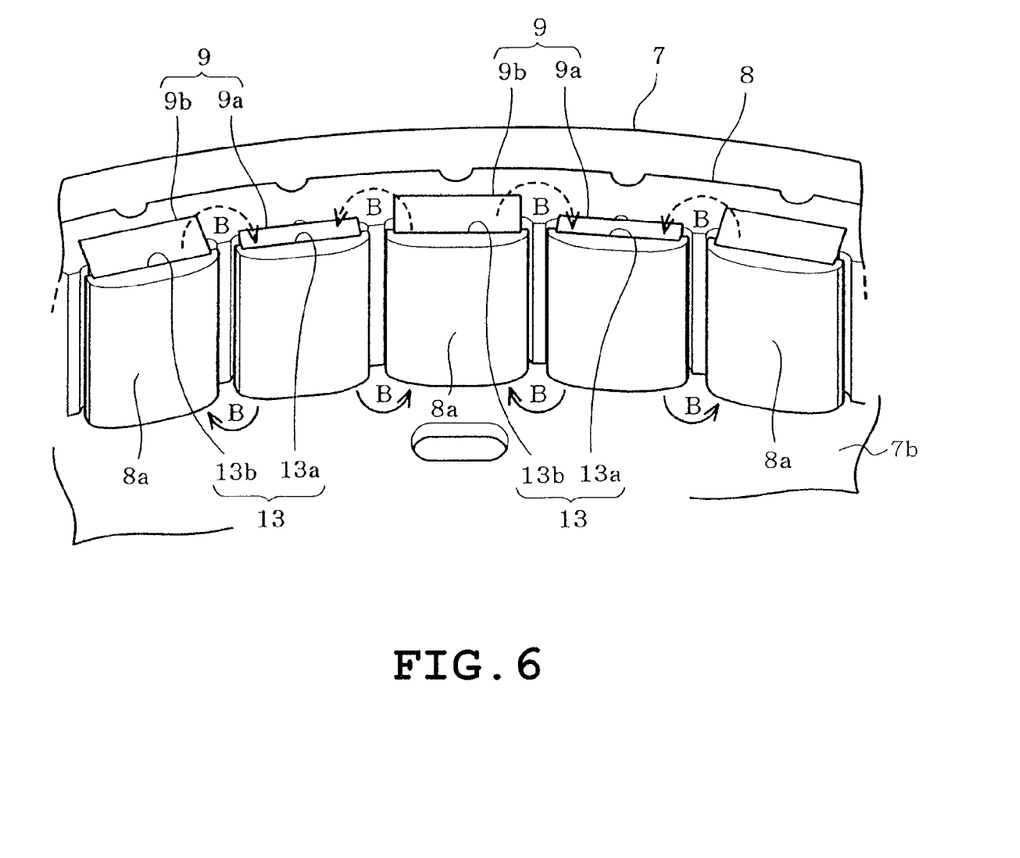
FIG. 6 is an enlarged view of a part of the rotor.

The rotor core 8 is formed by stacking and swaging a number of steel plates as a soft magnetic material stamped out substantially into an annular shape. The rotor core 8 is disposed along an inner circumference of the circumferential wall 7c of the frame 7. The rotor core 8 has an inner circumferential surface which is opposed to an outer circumferential surface of the stator 2 (an outer circumferential surface 4c of the stator core 4) thereby to define a gap together with the stator 2 therebetween. The inner circumferential surface of the rotor core 8 has a plurality of convex portions 8a inwardly protruding into an arc shape and is formed into a concavo-convex shape.

A plurality of rectangular insertion holes 13 is formed in the convex portions 8a respectively as shown in FIG. 6. The insertion holes 13 axially extend through the rotor core 8 (the direction in which the silicon steel plates are stacked) and are arranged annularly in the rotor core 8. The insertion holes 13 include two types of insertion holes 13a and 13b having different lengths of short sides. The insertion holes 13a and 13b are arranged circumferentially alternately with respect to the rotor core 8.

The permanent magnets 9 include rectangular neodymium magnets 9a (permanent magnets with high coercive force) inserted in the respective insertion holes 13a and rectangular alnico magnets 9b (permanent magnets with low coercive force) inserted in the respective insertion holes 13b. Each neodymium magnet 9a has a coercive force of about 900 kA/m, and each alnico magnet 9b has a coercive force of about 100 kA/m. The coercive force of each neodymium magnet 9a is nine times larger than the coercive force of each alnico magnet 9b. Thus, the permanent magnets 9 include two types of permanent magnets 9a and 9b having different coercive forces and are disposed in the rotor core 8 so that the neodymium and alnico magnets 9a and 9b are arranged alternately substantially annularly.

Each type of permanent magnets 9a and 9b has one magnetic pole and is arranged so that a magnetization direction is along the radial direction of the permanent magnet motor 1 (the direction from the outer circumference of the permanent magnet motor 1 toward the gap between the stator 2 and the rotor 3). Thus, when the two types of permanent magnets 9a and 9b are arranged alternately so that the magnetization direction is along the radial direction of the permanent magnet motor 1, the adjacent permanent magnets 9a and 9b have respective magnetic poles in opposite directions (a north pole of one type at the inside and a north pole of the other type at the outside). As a result, magnetic paths (magnetic flux) are established in the directions, for example, as shown by arrows B in FIG. 6 between the neodymium and alnico magnets 9a and 9b. Upper broken-line arrows B in FIG. 6 denote magnetic flux going through the rotor core 8. More specifically, the magnetic path is established so as to pass through both neodymium and alnico magnets 9a and 9b having large and small coercive forces.

Figure 7:
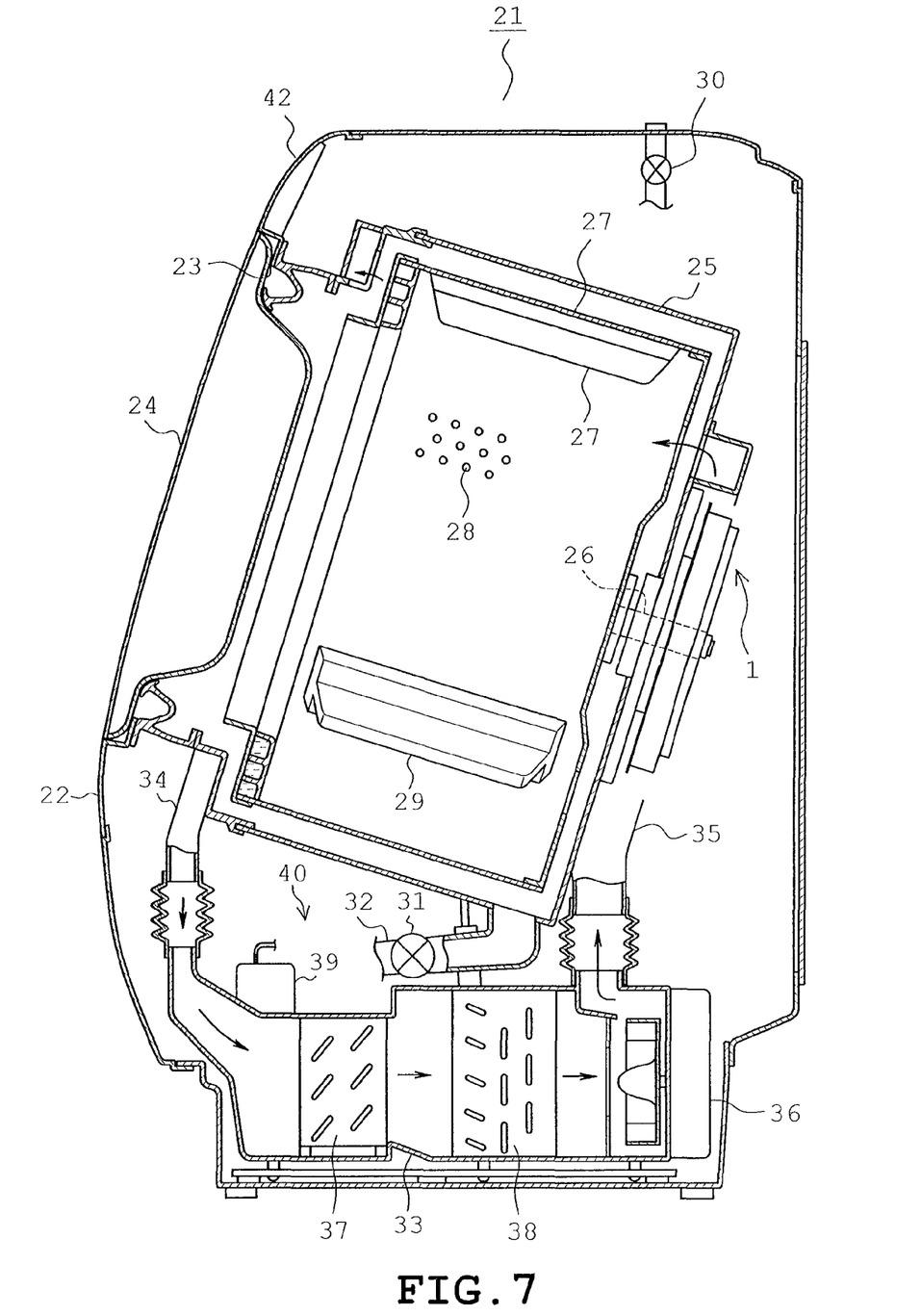
FIG. 7 is a longitudinal side section of the washer-dryer.

The construction of the drum washer-dryer 21 provided with the foregoing permanent magnet 1 will be described with reference to FIG. 7. FIG. 7 shows a schematic longitudinal side section of the drum washer-dryer 21. The drum washer-dryer 21 comprises an outer casing 22 having a circular access opening 23 formed in the front of the outer casing 22. Laundry is put into and taken out of a drum through the access opening 23. The access opening 23 is openably closed by a door 24. A bottomed cylindrical water tub 25 is enclosed in the outer casing 22 and has a closed rear. The above-described permanent magnet motor 1 (the stator 2) is secured on the central rear of the water tub 25 by screws (not shown). The permanent magnet motor 1 has a rotating shaft 26 further having a rear end (a right end in FIG. 7) fixed to the shaft mount 10 of the permanent magnet motor 1 (the rotor 3). The rotating shaft 26 also has a front end (a left end in FIG. 7) protruding into the water tub 25. The drum washer-dryer 21 further comprises a bottomed cylindrical drum 27 having a closed rear. The drum 27 is fixed to the front end of the rotating shaft 26 so as to be coaxial with the water tub 25, whereupon the drum 27 is rotated with the rotor 3 and the rotating shaft 26 by the permanent magnet motor 1. The drum 27 has a circumferential wall formed with a plurality of through holes 28 through which air and water are allowed to flow. A plurality of baffles 29 are formed on an inner circumferential wall of the drum 27. Laundry in the drum 27 is scraped and detangled by the baffles 29.

A water-supply valve 30 is connected to the water tub 25 and opened so that water is supplied into the water tub 25. Furthermore, a drain hose 32 having a drain valve 31 is also connected to the water tub 25 and opened so that water is discharged out of the water tub 25. An air-flow duct 33 is provided below the water tub 25 so as to extend in the front-back direction. The air-flow duct 33 has a front end which communicates through a front duct 34 with the interior of the water tub 25. The air-flow duct 33 further has a rear end which communicates through a rear duct 35 with the interior of the water tub 25. A blowing fan 36 is provided on the rear end of the air-flow duct 33. Upon drive of the blowing fan 36, air in the water tub 25 is caused to flow through the front duct 34 into the air-flow duct 33 as shown by arrows in FIG. 7. Thereafter, the air is returned through the rear duct 35 into the water tub 25.

An evaporator 37 is disposed at the front end side in the air-flow duct 33, and a condenser 38 is disposed at the rear end side in the air-flow duct 33. The evaporator 37 and the condenser 38 constitute a heat pump 41 together with a compressor 39 and a throttle valve 40 (see FIG. 8). Air flowing in the air-flow duct 33 is dehumidified by the evaporator 37 and heated by the condenser 38, thereby circulating in the water tub 25. The throttle valve 40 comprises an expansion valve (particularly, an electronic expansion valve such as a pulse motor valve (PMV)) and has an opening adjusting function.

An operation panel 42 is mounted on the front of the casing 22 so as to be located above the door 24. The operation panel 42 is electrically connected to a control circuit section (not shown) that is mainly composed of a microcomputer and controls an overall operation of the drum washer-dryer 21. On the operation panel 42 is provided a plurality of operation switches (not shown) for setting an operation course and the like. The control circuit section executes each of various operation courses based on contents set on the operation panel while controlling the permanent magnet motor 1, water-supply valve 30, drain valve 31, compressor 39, throttle valve 40 and the like. Furthermore, a compressor motor constituting the compressor 39 has the similar arrangement to the permanent magnet motor 1.

Figure 1A:
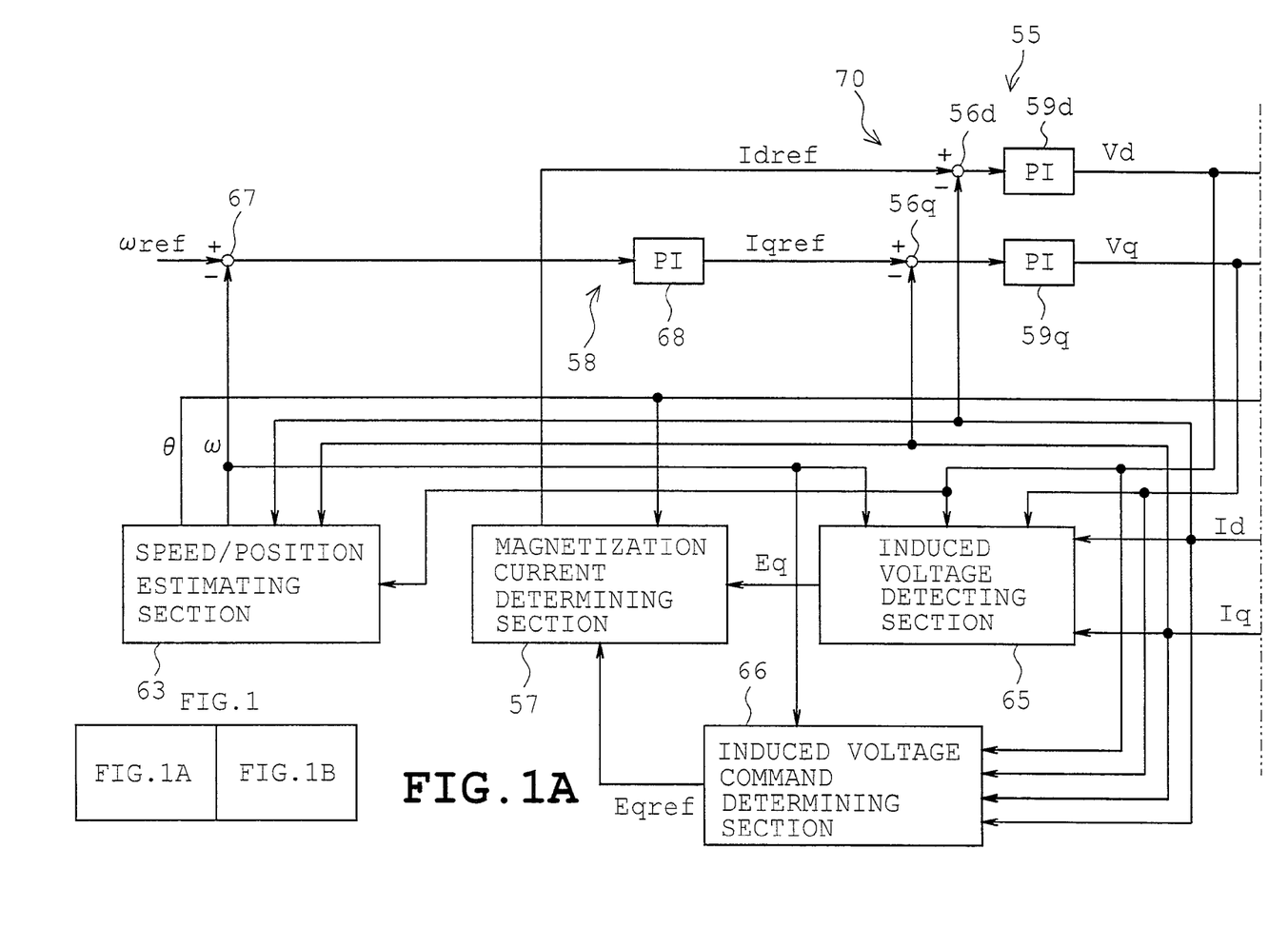
FIGS. 1A and 1B are block diagrams showing an electrical arrangement for vector control of motor rotation in a washing machine of a first embodiment.
Figure 1B:
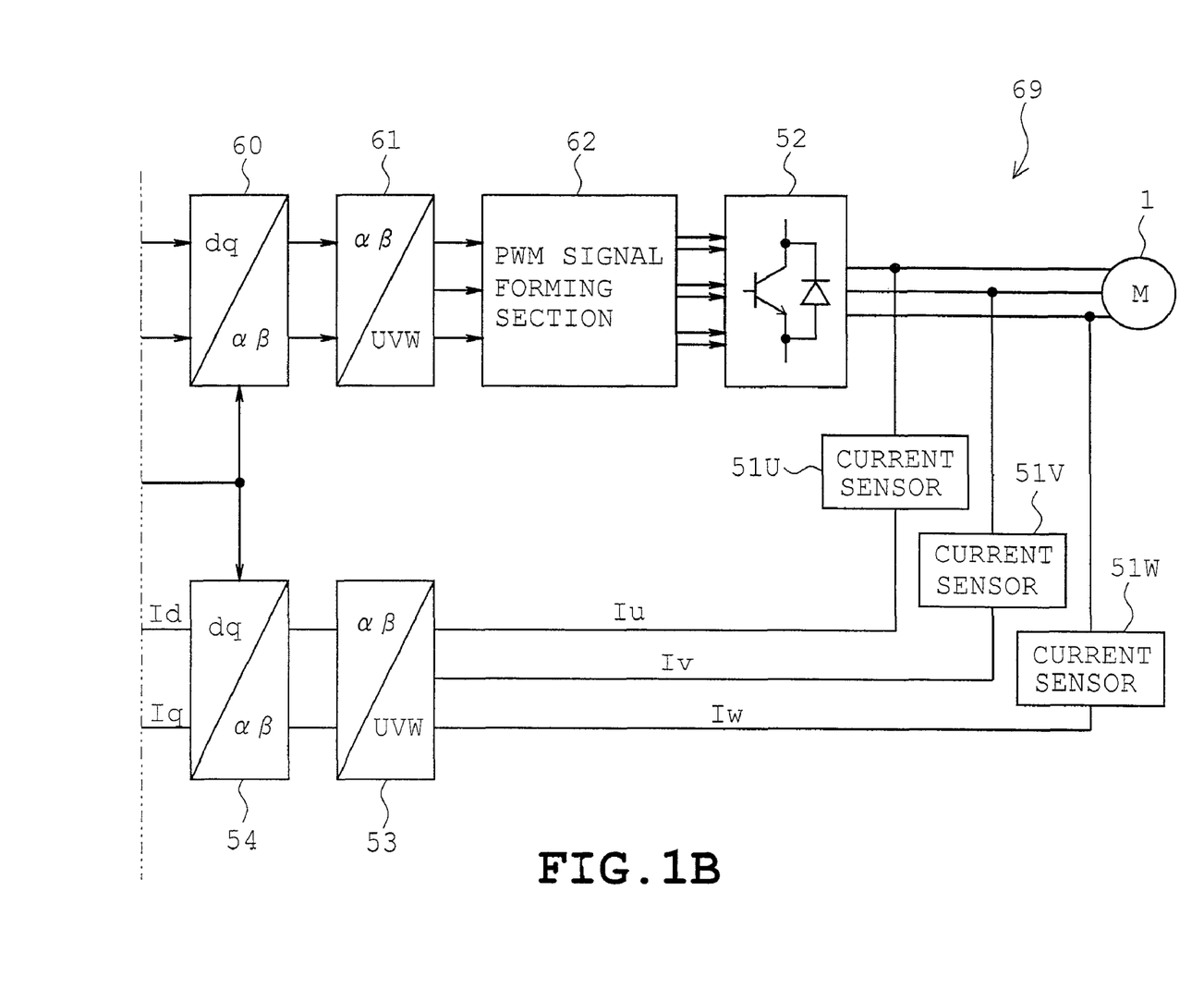

FIGS. 1A and 1B show an electrical arrangement of a motor control device 50 which executes a vector control for the permanent magnet motor 1. In the vector control, electric current flowing into an armature winding is divided into a component of a direction of magnetic flux of the permanent magnet that is a magnetic field and a component of a direction perpendicular to the magnetic flux direction. Both components are adjusted individually, so that magnetic flux and developed torque are controlled. The current control employs a coordinate system rotated with the rotor of the motor 1 or more specifically, current values represented by a d-q coordinate system. A d-axis denotes the direction of magnetic flux produced by a permanent magnet mounted on the rotor, and a q-axis denotes the direction perpendicular to the d-axis. A q-axis current Iq denotes a q-axis component of current flowing into a winding. The q-axis current Iq generates rotating torque (torque component current) A d-axis current Id denoting a d-axis component produces magnetic flux (excitation or magnetization component current).

Current sensors 51U, 51V and 51W are provided for detecting currents Iu, Iv and Iw flowing into respective phases of the motor 1. Alternatively, three shunt resistances may be provided between lower-arm switching elements constituting an inverter circuit 52 (a drive unit) and the ground, instead of the current sensors 51U, 51V and 51W, so that currents $I_u$, $I_v$ and $I_w$ may be detected based on terminal voltages of three shunt resistances provided between lower-arm switching elements constituting an inverter circuit 52 (a drive unit) and the ground respectively. The current sensors 51U, 51V and 51W are actually interposed between output terminals of the inverter circuit 52 and the windings 5 of the motor 1. An analog-to-digital (A/D) converter (not shown) converts the currents $I_u$, $I_v$ and $I_w$ detected by the respective current sensors 51U, 51V and 51W to corresponding digital signals. A UVW/αβ coordinate converter 53 converts the digital signals to two-phase currents $I_\alpha$ and $I_\beta$ respectively. An αβ/dq coordinate converter 54 further converts the two-phase currents $I_\alpha$ and $I_\beta$ to d-axis and q-axis currents $I_d$ and $I_q$. Reference symbols α and β denote coordinate axes of a biaxial coordinate system fixed to the stator of the motor 1. Computation in the coordinate conversion by the αβ/dq coordinate converter 54 employs a rotational position estimate θ with respect to the rotor (an estimate of phase difference between the α and d axes). The rotational position estimate θ will be described later.

A current control section 55 includes subtractors 56d and 56q. The subtractors 56d and 56q obtain current deviations $\Delta I_d$ and $\Delta I_q$ between the d-axis and q-axis currents $I_d$ and $I_q$ and d-axis and q-axis current commands $I_{dref}$ and $I_{qref}$. Proportional integrators 59d and 59q execute proportional integral for the current deviations $\Delta I_d$ and $\Delta I_q$, thereby obtaining output voltage commands $V_d$ and $V_q$ represented by the d-q coordinate system. A dq/αβ coordinate converter 60 converts the output voltage commands $V_d$ and $V_q$ to respective values represented by the α-β coordinate system. A αβ/UVW coordinate converter 61 further converts the values represented by the α-β coordinate system to respective phase voltage commands $V_u$, $V_v$ and $V_w$ of the stator. Computation in the coordinate conversion by the dq/αβ coordinate converter 60 also employs the rotational position estimate θ with respect to the rotor.

The phase voltage commands $V_u$, $V_v$ and $V_w$ are supplied to a pulse width modulation (PWM) signal forming section 62, which forms gate drive signals with respective modulated pulse widths so that voltages corresponding with the respective commands are supplied. The inverter circuit 52 comprises three-phase bridge-connected switching elements such as insulated gate bipolar transistors (IGBTs). A DC power supply circuit (not shown) applies DC voltage to the switching elements. The gate drive signals formed by the PWM signal forming section 62 are supplied to the gates of the switching elements constituting the inverter circuit 52, so that pulse-width-modulated three-phase AC voltages corresponding with the phase voltage commands $V_u$, $V_v$ and $V_w$ are generated to be applied to the armature windings of the motor 1, respectively.

In the above-described arrangement, a feedback control is carried out by the computation of the proportional integration (PI) executed by the subtractors 56*d* and 56*q*, proportional integrators 59*d* and 59*q*. Thus, the d-axis and q-axis currents I*d* and I*q* are controlled so as to correspond with the d-axis and q-axis current commands I$_{dref}$ and I$_{qref}$ respectively.

The d-axis and q-axis currents Id and Iq and a d-axis output voltage command V$_d$ are supplied to a speed/position estimating section 63 (speed/position estimating unit), which estimates an angular speed ω of the motor 1 and the rotational position θ of the rotor based on the supplied currents and commands. Furthermore, an induced voltage detecting section 65 (induced voltage detecting unit) stores data of values of d-axis and q-axis inductances L$_d$ and L$_q$ and winding resistance R of the armature windings which are circuit constants of the motor 1 (circuit constants). The speed/position estimating section 63 estimates the angular speed ω and the rotational position θ of the rotor using the following d-axis motor voltage equation (1):

$$V_d = R \cdot I_d - \omega \cdot L_q \cdot I_q \quad (1)$$

Furthermore, the rotational position estimate θ is delivered as the result of integration of the angular speed ω. Additionally, the angular speed estimate ω is also delivered to a speed control section 58.

The induced voltage detecting section 65 estimates an induced voltage E$_q$ of the motor 1 using the following q-axis motor voltage equation (2):

$$V_q = R \cdot I_q + \omega \cdot L_d \cdot I_d + E_q \quad (2)$$

An induced voltage command determining section 66 (induced voltage command determining unit) obtains an output torque T of the motor 1 using equation (3) denoting an output voltage of the inverter circuit 52 and equation (4) obtained by transforming equation (3):

$$3/2 \cdot (V_q \cdot I_q + V_d \cdot I_d) = \omega \cdot T + 3/2 \cdot R(Id^2 + Iq^2) \quad (3)$$

$$T = 3/(2\omega) \cdot \{V_q \cdot I_q + V_d \cdot I_d - R(I_d^2 + I_q^2)\} \quad (4)$$

The left-hand side of equation (3) denotes an output voltage of the inverter circuit 52. A first term of the right-hand side of equation (3) denotes output of the motor 1, and a second term of the right-hand side of equation (3) denotes copper loss.

The induced voltage command determining section 66 computes a current load point of the motor 1 based on the torque T and the angular speed ω of the motor 1 obtained by the speed/position estimating section 63. The speed/position estimating section 63 also obtains an induced voltage rendering the efficiency of motor 1 maximum for every load point and determines the induced voltage as the command value E$_{qref}$. The process of the determination will be described later.

The magnetization current determining section 57 determines the d-axis current command (magnetization current command) Idref for magnetizing the alnico magnets 9*b* constituting the rotor of the motor 1 when comparing the induced voltage E$_q$ estimated by the induced voltage detecting section 65 and the induced voltage command E$_{qref}$ determined by the induced voltage command determining section 66.

The speed control section 63 delivers the q-axis current command I$_{qref}$ in order that the angular speed ω of the rotor (corresponding to a rotating speed) may be caused to correspond with an externally input angular speed command (corresponding to a rotating speed command) ω$_{ref}$. The subtractor 67 calculates a deviation Δω between an angular speed command ω$_{ref}$ delivered by the control circuit section of the washer-dryer 21 and the angular speed estimate ω. The proportional integrator 68 carries out proportional integration for deviation Δω, delivering the result of the proportional integration as the q-axis current command I$_{qref}$.

Both d-axis and q-axis current commands I$_{dref}$ and I$_{qref}$ are supplied to the current control section 55 and controlled so that the d-axis and q-axis currents correspond with the respective commands as described above. As the result of the control, the angular speed estimate ω is fed back to the subtractor 67. The proportional integrator 68 causes the deviation Δω to converge to zero by proportional integration operation. As a result, the angular speed estimate ω corresponds with the angular speed command ω$_{ref}$.

In the above-described configuration, the motor drive system 69 comprises the permanent magnet motor 1 and the motor control device 50. Furthermore, the vector control unit 70 comprises the current control section 55, speed control section 58 and speed/position estimating section 63. Additionally, the arrangement of FIG. 1 is realized by software of the microcomputer composing the control device 50, except for the inverter circuit 52 and the PWM signal forming section 63.

The following describes the working of the drum washer-dryer provided with the above permanent magnet motor 1. When the control circuit section energizes the stator winding 5 via the inverter circuit 52, external magnetic field (magnetic field produced by the current flowing through the stator winding 5) due to reaction of the armature acts with the permanent magnets 9*a* and 9*b* of the rotor 3. Of the permanent magnets 9*a* and 9*b*, the alnico magnets 9*b* each having a smaller coercive force are demagnetized or magnetized by the external magnetic field due to the armature reaction, whereby a flux content interlinked with the stator winding 5 (interlinkage flux content) can be increased or decreased. In the embodiment, the control circuit section controls the energization of the stator winding 5 to switch the magnetized state of the alnico magnets 9*b* for every operation step (wash, dehydration and drying steps), thereby executing each operation step.

The operation steps will be described. Firstly, in a wash step, the control circuit section opens the water-supply valve 30 to supply water into the water tub 25. The control circuit section then rotates the drum 27 so that washing is carried out. In the wash step, the drum 27 needs to be rotated with high torque in order that laundry containing water or washing liquid may be raised upward by the baffles 29. However, the rotational speed may be low. The control circuit section then controls the energization of the stator winding 5 by the inverter circuit 52 so that the alnico magnets 9*b* are magnetized. As a result, since a flux content acting on the stator winding 5 is increased (magnetic force becomes intense), the drum 27 can be rotated at high torque and low speeds.

In the dehydration step, the control circuit section opens the drain valve 31 to discharge water from the water tub 25 and then rotates the drum 27 at high speeds so that water content is eliminated from laundry. The drum 27 needs to be rotated at high speeds in the dehydration step for improvement of a dehydrating efficiency but the torque may be small. The control circuit section then controls the energization of the stator winding 5 by the inverter circuit 52 so that the alnico magnets 9*b* are demagnetized. As a result, since a flux content acting on the stator winding 5 is decreased (magnetic force becomes weak), the drum 27 can be rotated at low torque and high speeds.

Finally, in the drying step, the control circuit section drives the blowing fan 36 and the heat pump 40 with rotation of the drum 27, thereby drying laundry. The control circuit section controls energization of the stator winding 5 by the inverter circuit 52 in preparation for a subsequent wash step so that the alnico magnets 9b are magnetized. As a result, a flux content acting on the stator winding 5 can be increased, whereupon the drum 27 can easily be rotated at high torque and low speeds in a subsequent wash step.

Figure 2:
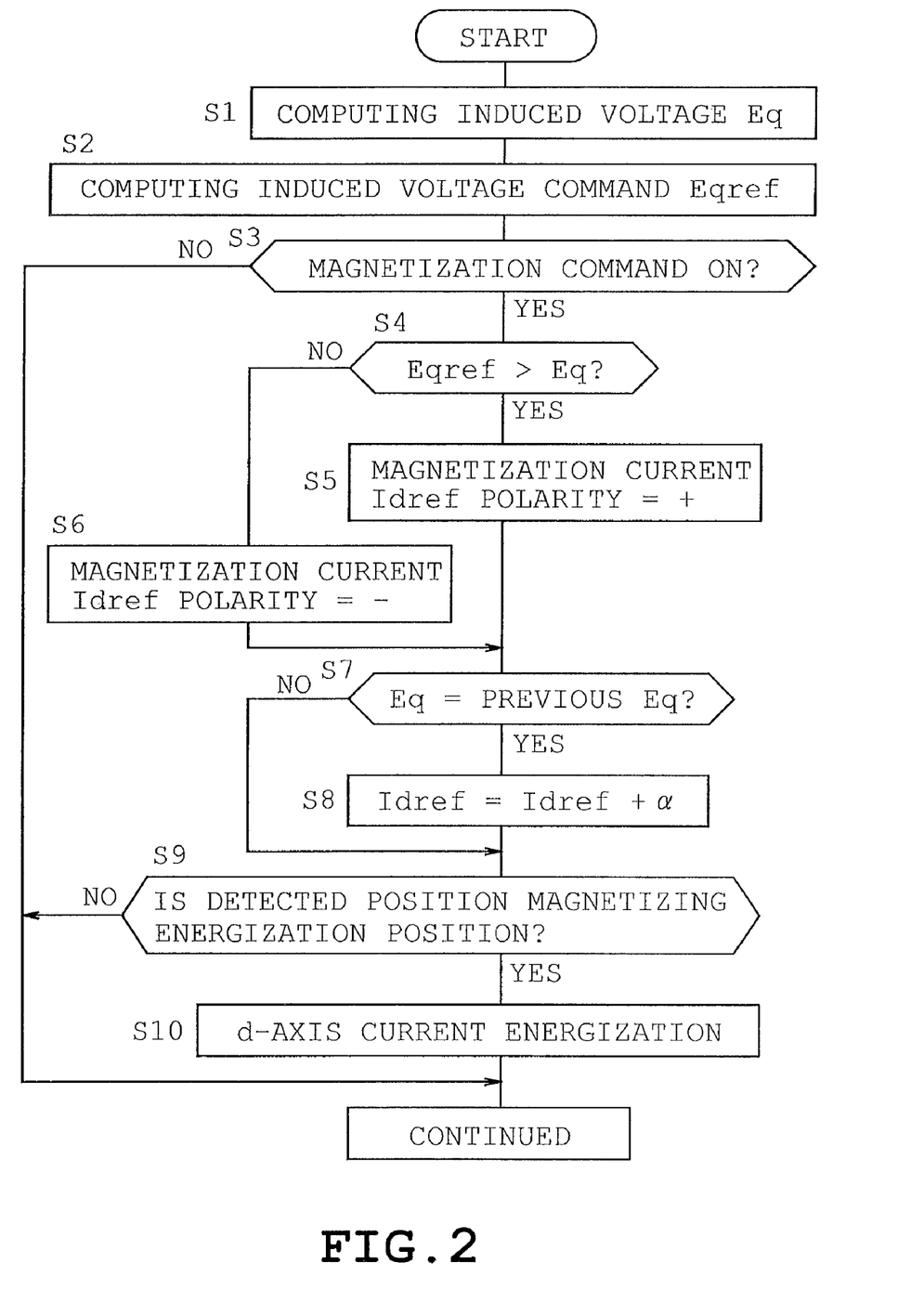
FIG. 2 is a flowchart showing processing contents for changing an amount of magnetization of the permanent magnet.
Figure 3:
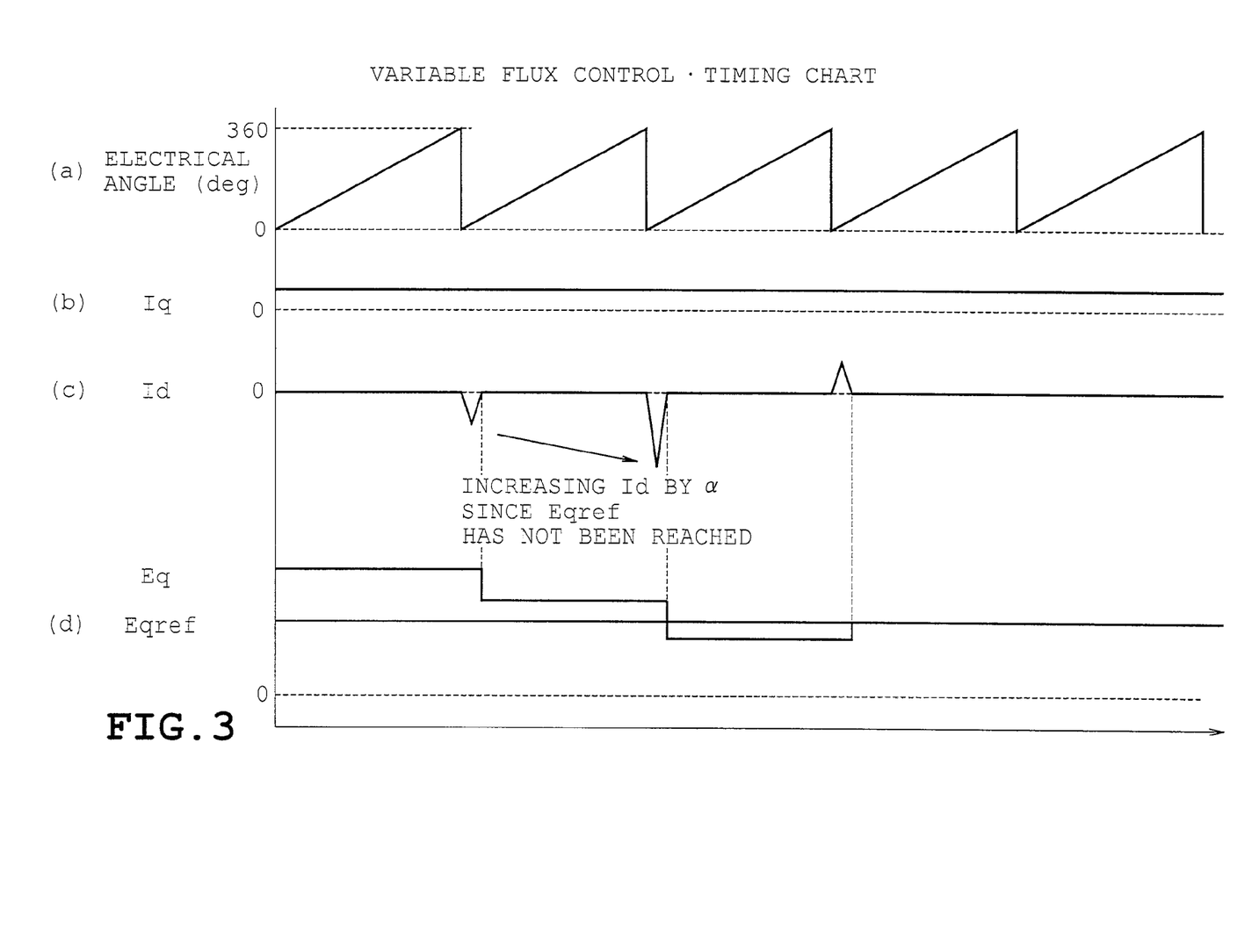
FIG. 3 is a timing chart showing changes in currents Id and Iq, induced voltage Eq and induced voltage command Eqref in the case where the control manner as shown in FIG. 2 is carried out repeatedly.
Figure 4:
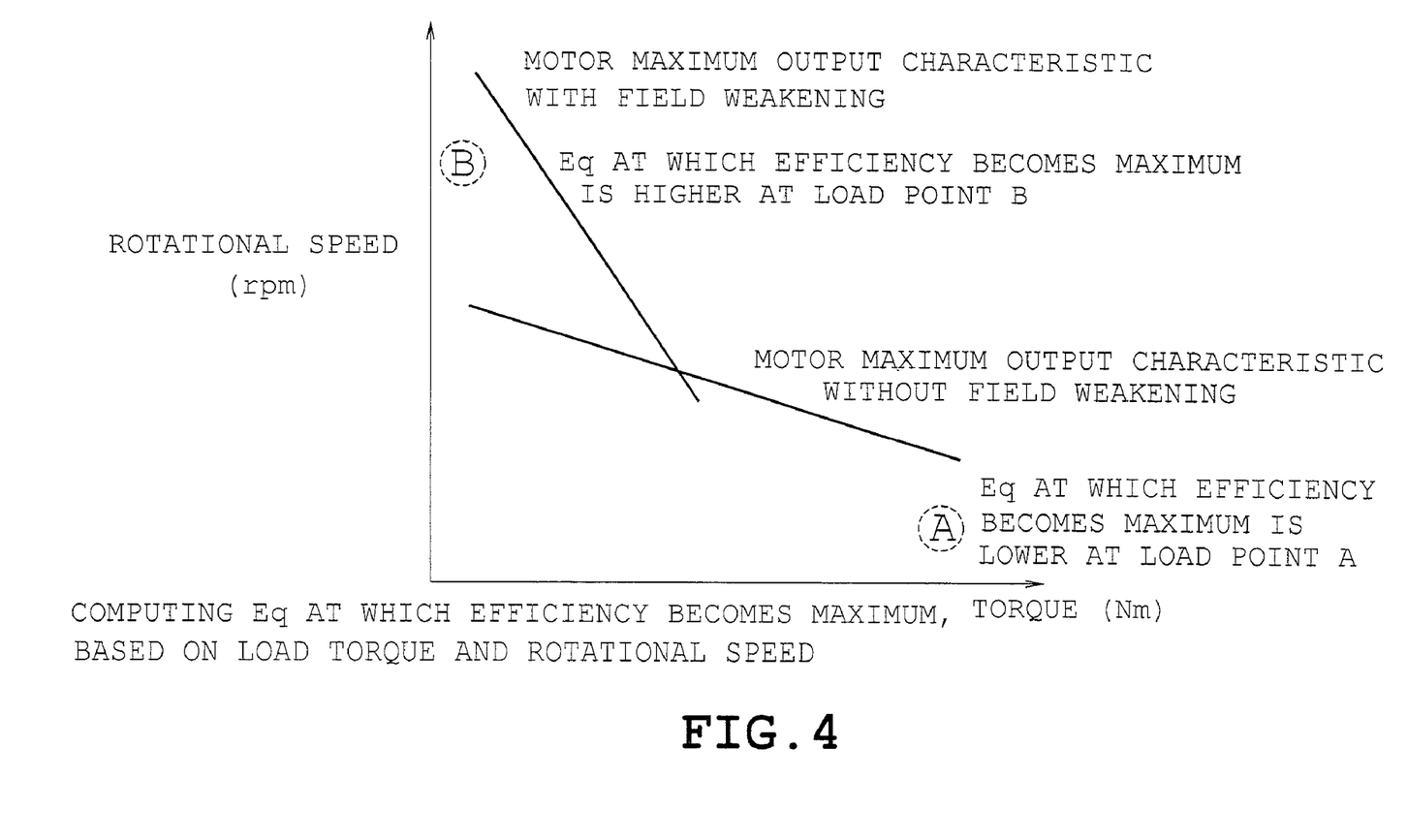
FIG. 4 is a graph showing maximum motor efficiencies corresponding to respective operating states of the washing machine.

The following describes a control manner in the case where an amount of magnetization of the alnico magnets 9b and a flux content of the motor 1 are changed according to the operation condition of the washer-dryer 21 or more specifically, the characteristics of the motor 1 are changed according to the operation condition of the washer-dryer 21, with reference to FIGS. 2 to 4 in addition to FIG. 1. It is important to recognize flux contents before and after energization in order that the flux content of the motor 1 may be changed by the d-axis current. The magnetization control is executed according to the flowchart of FIG. 2 for this purpose. Firstly, the induced voltage detecting section 65 obtains an induced voltage $E_q$ by computation (step S1). The induced voltage command determining section 66 determines the induced voltage command $E_{qref}$ based on the torque T and angular speed ω at the time (step S2). The magnetization current determining section 57 determines whether the control circuit section has supplied a magnetization command thereto (step S3). When the control circuit section has supplied a magnetization command to the magnetization current determining section 57 (YES at step S3), the magnetization current determining section 57 compares the induced voltage command $E_{qref}$ and the induced voltage $E_q$ (step S4). When $E_{qref} > E_q$ (YES at step S4), the magnetization current determining section 57 sets the polarity of magnetization current command Idref to the positive (+) (step S5). When $E_{qref} \leq E_q$ (NO at step S4), the magnetization current determining section 57 sets the polarity of magnetization current command $I_{dref}$ to the negative (-) (step S6).

When the induced voltage $E_q$ obtained by the induced voltage detecting section 65 is equal to the previous value (YES at step S7), the magnetization current determining section 57 increases the magnetization current command $I_{dref}$ by a predetermined value α (step S8). When the obtained induced voltage $E_q$ differs from the previous value (NO at step S7), the magnetization current determining section 57 advances to step S9. The aforesaid predetermined value α may be constant or may be changed each time. At step S9, the control circuit section determines whether the current rotational position of the motor 1 is a position for magnetizing energization. When the present rotational position is a position for magnetizing energization (YES at step S9), the motor 1 is energized by the d-axis current (step S10). When the current rotational position of the motor 1 is not a position for magnetizing energization (NO at step S9), the control circuit section returns to step S1 (CONTINUED).

FIG. 3 shows changes of the currents $I_d$ and $I_q$, induced voltage $E_q$ and induced voltage command $E_{qref}$ in the case where the control manner as shown by FIG. 2 is executed repeatedly. The torque current is controlled so as to be constant, and the excitation current $I_q$ is maintained at zero when the motor 1 is operated with full field. Since the excitation current $I_d$ is used for magnetizing the alnico magnets 9b in the embodiment, the excitation current $I_d$ is delivered in synchronization with the magnetization (electrical angle of 0°, for example). See FIG. 3. The magnetization process is terminated when the difference between the induced voltage $E_q$ and the induced voltage command $E_{qref}$ has become zero.

FIG. 4 shows maximum output characteristics of a motor in a normal operating state of a washing machine. The axis of abscissas designates torque by N·m and the axis of ordinates designates a rotational speed of the motor by rpm. Reference symbol "A" designates a point of load of the motor (ω=50 rpm and T=12 N·m, for example) in the wash or rinse operation. Thus, low speed rotation and high torque output are required in a wash or rinse operation. On the other hand, reference symbol "B" designates a motor lord point (ω=1200 rpm and T=2 N·m, for example) in a dehydration operation. High speed rotation and low torque output are required in the dehydration operation. The induced voltage $E_q$ at which the efficiency becomes maximum is relatively lower at load point A and higher at load point B.

The following describes the principle of determination of the induced voltage command $E_{qref}$ by the induced voltage command determining section 66. Equations (1) and (2) are substituted for respective "$V_d$" and "$V_q$" in equation (4) with the second term of the right-hand side thereof being regarded as copper loss and equation (4) is transformed into equation (5) as follows:

$$T = 3/(2\omega) \cdot \{V_q \cdot I_q + V_d \cdot I_d - (\text{copper loss})\} = \quad (5)$$
$$1.5\omega\{(R \cdot I_q + \omega \cdot L_d \cdot I_d \cdot E_q) \cdot I_q +$$
$$(R \cdot I_d - \omega \cdot L_q \cdot I_q) \cdot I_d - (\text{copper loss})\}$$
$$(\text{cooper loss}) = 1.5\omega(R \cdot I_q^2 + \omega \cdot L_d \cdot I_d \cdot I_q +$$
$$E_q + I_q + R \cdot I_d^2 - \omega \cdot L_q \cdot I_q \cdot I_d) - T$$

The efficiency of the motor 1 can be rendered maximum when the copper loss is minimum. Accordingly, when the values of T, ω, R, $L_d$ and $L_q$ are given in equation (5), induced voltage $E_q$ at which the copper loss becomes minimum is determined as induced voltage command $E_{qref}$.

In the above-described case, however, the q-axis current $I_q$ needs to include the condition that the q-axis current can develop a load torque of the motor 1, and the d-axis current $I_d$ needs to include the condition that the d-axis current $I_d$ should not increase DC voltage above a predetermined value since a field weakening control is carried out. Furthermore, the induced voltage command $E_{qref}$ may be determined by performing computation using equation (5) or may be stored in the form of data table on a memory or the like. For example, when a flux content of the motor 1 is reduced at load point B, an amount of energization of d-axis current Id for a field weakening control can be reduced or a necessary rotational speed can be obtained without field weakening control.

According to the foregoing embodiment, the magnetization current determining section 57 generates the armature reaction magnetic field by the excitation current Id obtained by the vector control, thereby changing the magnetization amount of the low coercive alnico magnets 9b constituting the rotor 3 of the motor 1. Since a change in the induced voltage Eq produced by the motor 1 reflects the change in the magnetization amount, the magnetization amount can be evaluated when the induced voltage $E_q$ is detected. Furthermore, the induced voltage command $E_{qref}$ is determined based on the rotational speed ω of the motor 1 and the output torque T. When the difference between the induced voltage command $E_{qref}$ and the detected induced voltage $E_q$ is obtained, it can be determined to what degree the magnetization amount of the alnico magnets 9b should be changed. Consequently, the magnetization amount can properly be changed according to the required drive characteristics, and the drive control can be achieved with improvement in the operation efficiency of the motor 1.

Figure 8:
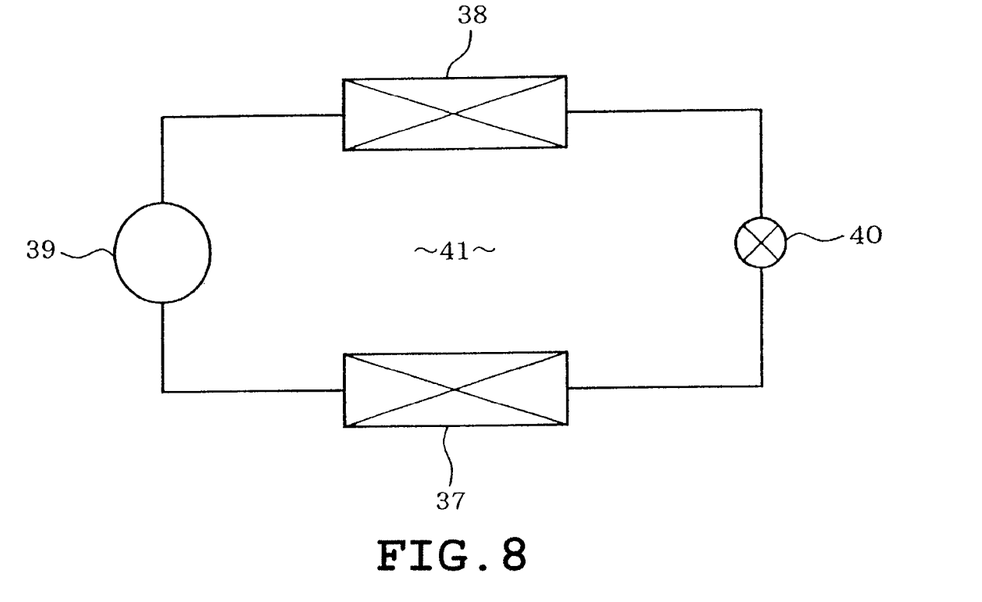
FIG. 8 is a schematic view showing an arrangement of heat pump employed in the washer-dryer.

Furthermore, the washer-dryer 21 includes the permanent magnet motor 1 generating a driving force for the wash or dehydration operation. Accordingly, the characteristics of the motor 1 are changed according to the drive characteristics for the low rotational speed and high output torque required in the wash operation and the drive characteristics for the high rotational speed and low output torque in the dehydration operation, whereupon the washer-dryer 21 can be operated with optimum efficiency and accordingly, electrical power consumption can be reduced. Particularly in the dehydration operation, the field weakening control need not be executed or the rotational speed of the motor 1 can be increased with minimum field weakening, control, whereupon the efficiency can be improved. Furthermore, the same control manner as described above is applied to the permanent magnet motor driving the compressor 39 of the heat pump 41. Consequently, the same effect as described above can be achieved in the drying operation.

Furthermore, the speed/position estimating section 63 computes the rotational speed ω and rotational position θ of the motor 1 using the d-axis motor voltage equation. The induced voltage detecting section 65 detects the induced voltage of the motor 1 using the q-axis motor voltage equation. Accordingly, the necessary values can be obtained by the simple computation. The induced voltage command determining section 66 makes a determination so that the efficiency becomes maximum according to the current operating state of the motor 1. More specifically, the induced voltage command determining section 66 determines the induced voltage command $E_{qref}$ according to equation (5) derived from equations (1) and (2) and equation (3) denoting output voltage of the inverter circuit 52 so that the copper loss becomes minimum. Consequently, the efficiency of the motor 1 can be rendered maximum so as to be suitable for the actual operating state of the washer-dryer 21.

Figure 9:
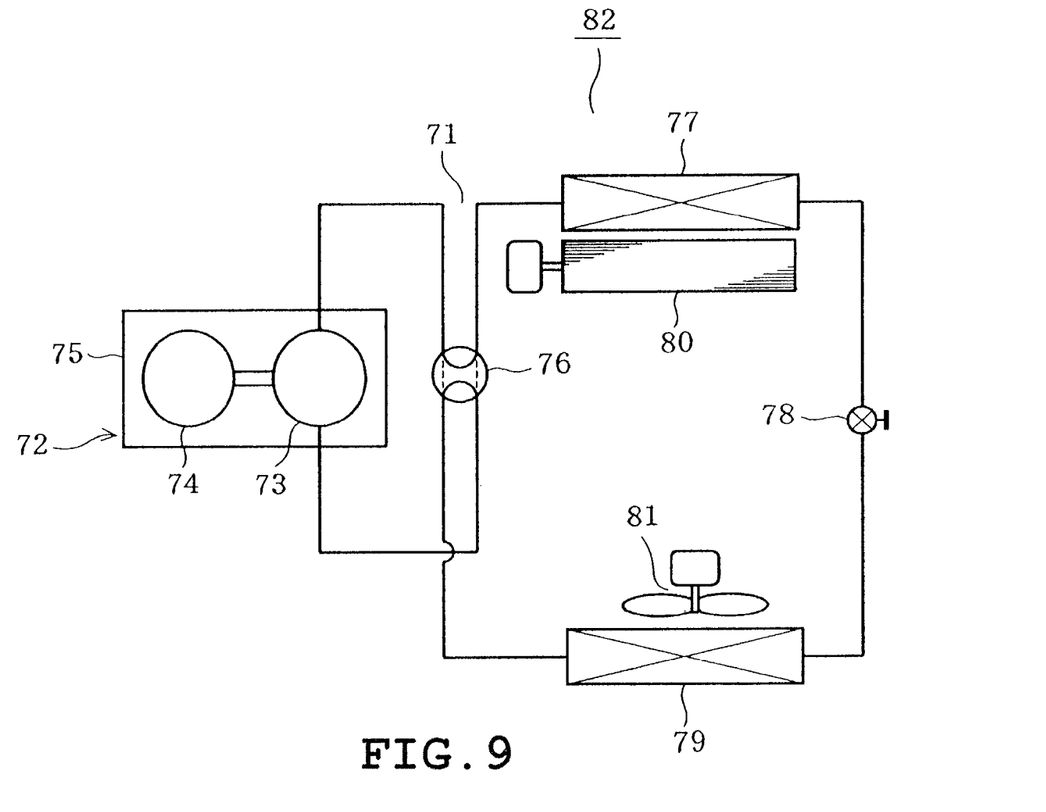
FIG. 9 is a view similar to FIG. 8, showing a second embodiment of an air conditioner.

FIG. 9 illustrates a second embodiment. Identical or similar parts in the second embodiment are labeled by the same reference symbols as those in the first embodiment and the description of these parts will be eliminated. The following will described only the difference of the second embodiment from the first embodiment. The motor drive system is applied to an air conditioner in the second embodiment. FIG. 9 shows a heat pump 71 constituting the air conditioner. The heat pump 71 comprises a compressor 72 which further comprises a compressing section 73 and a permanent magnet motor (DC brushless motor) 74 driving the compressing section 73. The compressing section 73 and the permanent magnet motor 74 are enclosed in a single iron closed container 75. The permanent magnet motor 74 has a similar construction as the motor 1 in the first embodiment. The permanent magnet motor 74 is controlled by a motor control device which is similar to the motor control device 50 in the first embodiment.

The compressor 72 is connected by refrigerant piping to a four-way valve 76, an indoor heat exchanger 77, a pressure reducing device 78 and an outdoor heat exchanger 79 so that a closed loop is formed. The four-way valve 76 is switchable between states as shown by solid line and chain line in FIG. 9 according to warming and cooling operations respectively. Refrigerant compressed by the compressing section 73 of the compressor 72 is controlled so as to flow through the indoor heat exchanger 77, the pressure reducing device 78 and the outdoor heat exchanger 79 sequentially to be returned into the compressing section 73 in the warming operation. In the cooling operation, the refrigerant is also controlled so as to flow through the outdoor heat exchanger 79, the pressure reducing device 78 and the indoor heat exchanger 77 to be returned into the compressing section 73. Accordingly, the indoor heat exchanger 77 serves as a condenser to warm an atmosphere in a room during the warming operation and as an evaporator to cool the atmosphere in the room during the cooling operation. Indoor air and outdoor air are sent to the indoor and outdoor heat exchangers 77 and 79 by fan devices 80 and 81 respectively. Thus, all the devices and apparatus 77 to 81 constitute an air conditioner 82.

According to the above-described second embodiment, the air conditioner 82 is provided with the motor drive system similar to that in the first embodiment, and the compressor 72 is driven by the permanent magnet motor 74. Accordingly, the room interior temperature needs to be rapidly increased or decreased in a short period of time immediately after start of the operation, for example. An amount of magnetic flux of the alnico magnets 9b is changed when the compressor 72 is rotated at high speeds, so that the efficiency is rendered maximum so as to correspond to the load point B as shown in FIG. 4. Thus, electrical power consumption can be reduced when the characteristics of the motor 74 are changed so to be suitable for each operation mode.

The foregoing embodiments are not restrictive, and the following deformation or expansion is possible. The invention may be applied to permanent magnet motors of the IPM type as disclosed by patent document 1. The invention may be applied to a washing machine without drying function.

The low coercive permanent magnet should not be limited to the alnico magnets 9b. A permanent magnet made from any material when having such a low coercive force that an amount of magnetization is changeable by the magnetic field generated by energization by way of an inverter circuit. Similarly, the high coercive permanent magnet should not be limited to the neodymium magnets 9a.

No permanent magnet having a high coercive force is necessary when the required operating characteristics can be met by changing a magnetization amount of the permanent magnets each having a low coercive force.

The above-described order of the process of detecting the motor induced voltage and the process of determining the induced voltage command may be reversed. Furthermore, the invention should not be limited to the washing machine and the air conditioner but can be broadly applied to any apparatus or system in which an amount of magnetic flux is changed in an electric motor comprising low coercive permanent magnets.

The foregoing description and drawings are merely illustrative of the principles and are not to be construed in a limiting sense. Various changes and modifications will become apparent to those of ordinary skill in the art. All such changes and modifications are seen to fall within the scope as defined by the appended claims.

What is claimed is:

1. A motor control device which controls a permanent magnet motor including a rotor provided with a permanent magnet having such a low coercive force that a magnet flux content is changeable, the device comprising:
 a drive unit which drives the motor by energization of a winding of the motor;
 a magnetization control unit which energizes the motor winding via the drive unit, thereby changing a flux content of the permanent magnet motor;
 a current detector which detects current supplied to the motor;
 a vector control unit including a speed/position estimation unit which carries out an operation based on the motor current, an output voltage of the drive unit and a motor constant thereby to estimate a rotational speed and rotational position of the motor, the vector control unit carrying out a vector control of the motor via the drive unit;

an induced voltage detector which detects an induced voltage of the motor based on the rotational speed, motor currents obtained by the vector control unit, output voltages of the drive unit, a winding inductance that is the motor constant and a winding resistance;

an induced voltage command determining unit which determines an induced voltage command based on the rotational speed and an output torque of the motor; and a magnetization current determining unit which determines an amount of energization based on the induced voltage of the motor and the induced voltage command.

2. The motor control device according to claim 1, wherein the speed/position estimation unit uses a d-axis motor voltage equation in the operation of the rotational speed and rotational position of the motor, and the induced voltage detector uses a q-axis motor voltage equation in the detection of the induced voltage of the motor.

3. The motor control device according to claim 1, wherein the induced voltage command determining unit determines the induced voltage command so that an efficiency becomes maximum according to a current operating state of the motor.

4. The motor control device according to claim 2, wherein the induced voltage command determining unit determines the induced voltage command so that an efficiency becomes maximum according to a current operating state of the motor.

5. The motor control device according to claim 3, wherein the induced voltage command determining unit determines the induced voltage command so that a copper loss becomes minimum according to a current operating state of the motor.

6. The motor control device according to claim 4, wherein the induced voltage command determining unit determines the induced voltage command so that a copper loss becomes minimum according to a current operating state of the motor.

7. A motor drive system comprising:

a permanent magnet motor including a rotor provided with a permanent magnet having such a low coercive force that a magnet flux content is changeable;

a drive unit which drives the motor by energization of a winding of the motor;

a magnetization control unit which energizes the motor winding via the drive unit, thereby changing a magnetic flux content of the permanent magnet motor;

a current detector which detects current supplied to the motor;

a vector control unit including a speed/position estimation unit which carries out an operation based on the motor current, an output voltage of the drive unit and a motor constant thereby to estimate a rotational speed and rotational position of the motor, the vector control unit carrying out a vector control of the motor via the drive unit;

an induced voltage detector which detects an induced voltage of the motor based on the rotational speed, motor currents obtained by the vector control unit, output voltages of the drive unit, a winding inductance that is the motor constant and a winding resistance;

an induced voltage command determining unit which determines an induced voltage command based on the rotational speed and an output torque of the motor; and a magnetization current determining unit which determines an amount of energization based on the induced voltage of the motor and the induced voltage command.

8. A washing machine comprising:

a permanent magnet motor including a rotor provided with a permanent magnet having such a low coercive force that a magnet flux content is changeable;

a drive unit which drives the motor by energization of a winding of the motor;

a magnetization control unit which energizes the motor winding via the drive unit, thereby changing a magnetic flux content of the permanent magnet motor;

a current detector which detects current supplied to the motor;

a vector control unit including a speed/position estimation unit which carries out an operation based on the motor current, an output voltage of the drive unit and a motor constant thereby to estimate a rotational speed and rotational position of the motor, the vector control unit carrying out a vector control of the motor via the drive unit;

an induced voltage detector which detects an induced voltage of the motor based on the rotational speed, motor currents obtained by the vector control unit, output voltages of the drive unit, a winding inductance that is the motor constant and a winding resistance;

an induced voltage command determining unit which determines an induced voltage command based on the rotational speed and an output torque of the motor; and a magnetization current determining unit which determines an amount of energization based on the induced voltage of the motor and the induced voltage command, wherein a driving force for a washing or dehydrating operation is produced by the permanent magnet motor.

9. The washing machine according to claim 8, which has a function of executing a drying operation using a heat pump, wherein the heat pump includes a compressor driven by the permanent magnet motor.

10. An air conditioner comprising:

a permanent magnet motor including a rotor provided with a permanent magnet having such a low coercive force that a magnet flux content is changeable;

a drive unit which drives the motor by energization of a winding of the motor;

a magnetization control unit which energizes the motor winding via the drive unit, thereby changing a magnetic flux content of the permanent magnet motor;

a current detector which detects current supplied to the motor;

a vector control unit including a speed/position estimation unit which carries out an operation based on the motor current, an output voltage of the drive unit and a motor constant thereby to estimate a rotational speed and rotational position of the motor, the vector control unit carrying out a vector control of the motor via the drive unit;

an induced voltage detector which detects an induced voltage of the motor based on the rotational speed, motor currents obtained by the vector control unit, output voltages of the drive unit, a winding inductance that is the motor constant and a winding resistance;

an induced voltage command determining unit which determines an induced voltage command based on the rotational speed and an output torque of the motor; and a magnetization current determining unit which determines an amount of energization based on the induced voltage of the motor and the induced voltage command, wherein a compressor is driven by the permanent magnet motor.

11. A method of changing a magnetization amount of a permanent magnet motor, comprising:

detecting an energizing current supplied via a drive unit to the motor including a rotor provided with a permanent magnet having such a low coercive force that a magnet flux content is changeable;

changing a magnetization amount of the permanent magnet via the drive unit when an operation is carried out based on the motor energizing current, an output voltage of the drive unit and a motor constant thereby to estimate a rotational speed and rotational position of the motor;

detecting an induced voltage of the motor based on the rotational speed, motor currents obtained by a vector control, output voltages of the drive unit, a winding inductance that is the motor constant and a winding resistance;

determining an induced voltage command based on the rotational speed of the motor and an output torque of the motor; and determining an amount of energization based on the induced voltage of the motor and the induced voltage command.

12. The method according to claim 11, wherein a d-axis motor voltage equation is used in the operation of the rotational speed and rotational position of the motor, and a q-axis motor voltage equation is used in the detection of the induced voltage of the motor.

13. The method according to claim 11, wherein the induced voltage command is determined so that an efficiency becomes maximum according to a current operating state of the motor.

14. The method according to claim 12, wherein the induced voltage command is determined so that an efficiency becomes maximum according to a current operating state of the motor.

15. The method according to claim 13, wherein the induced voltage command is determined so that a copper loss becomes minimum according to a current operating state of the motor.

16. The method according to claim 14, wherein the induced voltage command is determined so that a copper loss becomes minimum according to a current operating state of the motor.

* * * * *